United States Patent Office 3,105,294
Patented Oct. 1, 1963

3,105,294
BERYLLIUM BRAZING
Denzil Malcolm Atkinson, Southgate, London, England, assignor to Associated Electrical Industries (Manchester) Limited, London, England, a company of Great Britain
No Drawing. Filed Aug. 12, 1960, Ser. No. 49,155
Claims priority, application Great Britain Mar. 13, 1957
3 Claims. (Cl. 29—488)

This invention relates to the brazing of beryllium. It is a continuation-in-part application of my co-pending U.S. patent application Serial No. 718,956, filed March 4, 1958, now abandoned.

There are many applications in which it is desirable to braze beryllium in a manner which will resist subsequent fracture, one important application being in X-ray tubes. Beryllium is a particularly convenient material to use as an X-ray window in such tubes as it has a low absorption to X-rays. Clearly it is necessary to provide a vacuum tight joint between the beryllium window and its surrounding frame.

However, it is notoriously difficult to obtain a brazed joint with beryllium that will not fracture, particularly when subjected to high temperatures and stresses.

It is accordingly an object of the present invention to provide a more satisfactory joint than can be made by known methods.

In carrying out the invention before brazing the beryllium to a base metal the beryllium is first heated in an atmosphere containing nitrogen and then immersed in a hot cyanide bath containing Rochelle salt, copper is then electro-plated onto the immersed surface and thereafter the copper-plated region is brazed to a base metal by means of a brazing solder containing palladium. Alternatively palladium is plated on to the copper-plated surface and then the copper-plated and palladium-plated surface can be brazed to a base metal using a known brazing solder such as a silver-copper alloy.

The heating of the beryllium in an atmosphere of nitrogen etches the surface of the beryllium and also forms a protective film of beryllium nitride. The hot cyanide bath decomposes the beryllium nitride to beryllium hydroxide and ammonia and the Rochelle salt (sodium potassium tartrate) contained in the bath dissolves the beryllium hydroxide from the surface of the beryllium and thus leaves it clean for the deposition of copper.

During the brazing the copper-plating, or the copper and palladium plating, completely diffuses into the brazing alloy and thus leaves no mechanical or vacuum weakness.

Suitable base metals to which the beryllium can be brazed are Monel metal and copper plated mild steel. The surfaces should be outgassed prior to brazing.

In order that the invention may be more clearly understood the following examples of methods of carrying out the invention are given. In each case a single lap joint is formed between the beryllium and the base metal and the joints are so designed as to prevent the brazing alloy from being drawn away from the surfaces being brazed by capillary attraction.

*Example 1*

The beryllium is etched by heating to approximately 900° C. in an atmosphere of cracked ammonia. Copper is then electro-plated directly upon the mating regions of the etched surface by deposition from a hot cyanide bath containing Rochelle salt, beryllium hydroxide being dissolved from the intersurface. The beryllium window is then placed in position with a washer of palladium-silver-copper alloy solder introduced between the copper-plated beryllium and the surrounding frame to which the beryllium is to be attached. This solder contains 5% of palladium.

The beryllium and frame are now heated in a resistance or induction furnace to a temperature slightly above the liquids of the solder and in an atmosphere of high purity hydrogen or in a vacuum of $10^{-5}$ mm. of mercury or better. At the same time positive pressure is exerted between the members being brazed.

*Example 2*

The beryllium is etched by heating to approximately 900° C. in an atmosphere of cracked ammonia. Copper is electro-plated directly upon the mating regions of the etched surface as described in Example 1, and then palladium is electro-plated upon the copper deposit. The palladium is deposited from a bath containing palladium tetrammino-nitrate. The copper-plated and palladium-plated beryllium is now placed in position with a washer of a silver-copper alloy solder being pre-placed between the members to be brazed. This solder contains 72% silver and 28% copper. The brazing is then carried out as in Example 1.

A suitable thickness for the solder washer used in the above examples is 0.003 in. It has been found in practice that no undue brittleness exists in a joint brazed in accordance with the above examples, and on a fracture test failure occurred in the outer beryllium layers and not at the interface.

What I claim is:

1. The method of brazing beryllium to a base metal comprising the steps of heating the beryllium in an atmosphere of cracked ammonia to etch the surface thereof, immersing the beryllium in a hot cyanide bath containing Rochelle salt and electroplating copper onto the etched surface, and then brazing the copper-plated region to a base metal by means of a brazing solder containing palladium.

2. The method of brazing beryllium to a base metal comprising the preliminary steps of heating the beryllium in an atmosphere of cracked ammonia to etch the surface thereof, immersing the beryllium in a hot cyanide bath containing Rochelle salt and electroplating copper onto the immersed surface, electroplating palladium onto the copper-plated surface and then brazing the palladium-plated surface to a base metal by means of a brazing solder.

3. The method of brazing beryllium to a base metal comprising the preliminary steps of heating the beryllium in an atmosphere of cracked ammonia to etch the surface thereof, immersing the beryllium in a hot cyanide bath containing Rochelle salt and electroplating copper onto the immersed surface, immersing the beryllium in a bath containing palladium tetrammino-nitrate, electroplating palladium from said bath onto said copper-plated surface, and then brazing the palladium and copper-plated region to a base metal by means of a brazing solder containing about 72% silver and 28% copper.

References Cited in the file of this patent

UNITED STATES PATENTS

| | | |
|---|---|---|
| 1,840,724 | Koehring | Jan. 12, 1932 |
| 2,654,946 | Rhodes et al. | Oct. 13, 1953 |
| 2,770,033 | Zarth | Nov. 13, 1956 |
| 2,844,867 | Wernz | July 29, 1958 |

OTHER REFERENCES

Metals Handbook, 1948 edition, page 718.